United States Patent
Roberfroid et al.

(10) Patent No.: US 8,782,913 B2
(45) Date of Patent: Jul. 22, 2014

(54) METHOD OF DETERMINING HEADING BY TURNING AN INERTIAL DEVICE

(75) Inventors: David Roberfroid, Paris (FR); Jean-Baptiste Eudier, Paris (FR); Alexandre Gori, Paris (FR)

(73) Assignee: Sagem Defense Securite, Paris (FR)

( * ) Notice: Subject to any disclaimer, the term of this patent is extended or adjusted under 35 U.S.C. 154(b) by 222 days.

(21) Appl. No.: 13/509,976

(22) PCT Filed: Dec. 6, 2010

(86) PCT No.: PCT/EP2010/007387
§ 371 (c)(1),
(2), (4) Date: May 15, 2012

(87) PCT Pub. No.: WO2011/069626
PCT Pub. Date: Jun. 16, 2011

(65) Prior Publication Data
US 2012/0222320 A1    Sep. 6, 2012

Related U.S. Application Data

(60) Provisional application No. 61/345,398, filed on May 17, 2010.

(30) Foreign Application Priority Data

Dec. 7, 2009   (FR) ...................................... 09 05917

(51) Int. Cl.
G01C 19/38    (2006.01)
(52) U.S. Cl.
CPC ...................................... *G01C 19/38* (2013.01)
USPC .......................................................... 33/324
(58) Field of Classification Search
CPC ...................................................... G01C 19/38
USPC .......................................................... 33/324
See application file for complete search history.

(56) References Cited

U.S. PATENT DOCUMENTS

| | | | |
|---|---|---|---|
| 3,894,341 A * | 7/1975 | Kapeller | 33/324 |
| 4,686,771 A | 8/1987 | Beveventano et al. | |
| 7,997,134 B2 * | 8/2011 | Lignon et al. | 73/504.12 |
| 8,151,475 B2 * | 4/2012 | Albo et al. | 33/318 |
| 2003/0006671 A1 * | 1/2003 | Hiedenstierna et al. | 310/319 |
| 2005/0022402 A1 | 2/2005 | Ash et al. | |
| 2007/0039386 A1 * | 2/2007 | Stewart et al. | 73/504.14 |
| 2011/0232359 A1 * | 9/2011 | Caron | 73/1.77 |
| 2012/0222319 A1 * | 9/2012 | Roberfroid et al. | 33/301 |

FOREIGN PATENT DOCUMENTS

| | | |
|---|---|---|
| GB | 2 351 807 A | 1/2001 |
| GB | 2 369 188 A | 5/2002 |
| WO | WO 2004/046646 A2 | 6/2004 |

* cited by examiner

*Primary Examiner* — Christopher Fulton
(74) *Attorney, Agent, or Firm* — Muncy, Geissler, Olds & Lowe, P.C.

(57) ABSTRACT

A method of determining a heading by means of an inertial device (1) providing measurements by means of at least one vibratory gyro (3), the method comprising the steps of: •positioning the inertial device in such a manner that the gyro extends close to a plane that is substantially horizontal; •orienting the inertial device successively in a predetermined number of orientations about a vertical axis, the predetermined number being greater than one; •for each orientation, adjusting the electric angle of the vibratory gyro to a predetermined value, the predetermined value of the electric angle being the same for all of the orientations of the inertial device, and taking a measurement; and •determining the heading from the measurements and an angle between the orientations.

10 Claims, 1 Drawing Sheet

METHOD OF DETERMINING HEADING BY TURNING AN INERTIAL DEVICE

Figure 1:
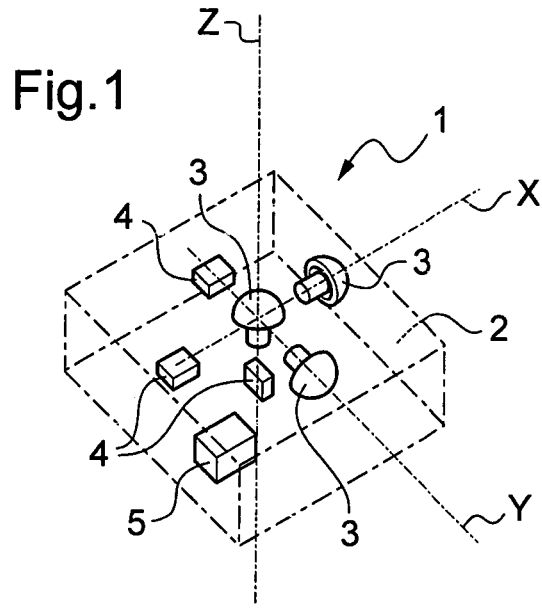

The present invention relates to a method of determining a heading by means of an inertial device suitable for use as a gyro compass, for example, and for seeking north.

It is known to determine a heading by means of a gyro compass type inertial device having three angle sensors (rate gyros or free gyros) and two or three accelerometers in order to measure and position the rotation of the Earth.

In order to improve the accuracy with which heading is determined, it is known to take heading measurements with the inertial device in two different angular positions relative to the vertical axis. This method is known as two-position alignment.

Also known are vibratory gyros that are conventionally used in inertial systems for navigation, e.g. as in a gyro compass adapted to provide an angle measurement relative to a reference direction that is the direction of geographic north (heading). Vibratory gyros are axially symmetrical and rely on the Coriolis effect, being referred to as Coriolis vibratory gyros (CVG), e.g. having a resonator that is hemispherical, known as a hemispherical resonance gyro (HRG), and they are more generally said to be of type I as in the document "Type I and type II micro-machined vibratory gyroscopes" by Andrei M. Shkel, pp. 586-593, IEEE/ION ("Institute of Electrical and Electronic Engineers/Institute of Navigation") PLANS 2006, San Diego, Calif., USA. Those gyros operate in particular in an open loop and they serve to measure an absolute angle of rotation on the basis of a measured angle, referred to as the "electric" angle, representing the position of the vibration of the gyro relative to measurement electrodes. The measurements provided by such vibratory gyros may suffer from errors that are essentially a function of the position of the vibration relative to the measurement electrodes. Those errors thus vary as a function of the position of the vibration represented by the electric angle.

An object of the invention is to provide means for further improving performance in terms of heading determination when using an inertial device provided with vibratory gyros.

To this end, the invention provides a method of determining a heading by means of an inertial device providing measurements by means of at least one vibratory gyro, the method comprising the steps of:

positioning the inertial device in such a manner that the gyro extends close to a plane that is substantially horizontal;

orienting the inertial device successively in a predetermined number of orientations about a vertical axis, the predetermined number being greater than one;

for each orientation, adjusting the electric angle of the vibratory gyro to a predetermined value, the predetermined value of the electric angle being the same for all of the orientations of the inertial device, and taking a measurement; and determining the heading from the measurements and an angle between the orientations.

Thus, by taking account of a plurality of measurements and of the angle between the orientations of the inertial device about the vertical axis, with the electric angle being adjusted to the same value regardless of the angular position of the inertial device, and by performing the measurement in free gyro mode, it is possible to obtain better accuracy in determining heading. Controlling the angle sensor in free gyro mode makes it possible in particular to ignore gain errors that might be involved when operating in rate gyro mode. When the inertial device includes not only said gyro but also another sensor such as at least one other gyro and/or at least one accelerometer, the measurements provided by all of the sensors are used in order to determine heading.

In a first implementation, the device has at least two gyros and it is positioned so that both gyros extend in the vicinity of the horizontal plane, and the predetermined number of orientations is not less than two, and, preferably, the angle between the orientations is 180°.

The drift measured for each of the angle sensors is identical for each orientation, and positioning them in two angular positions that are opposite enables the harmonic errors that are contained in the measurements (at the predetermined value of the electric angle) to be eliminated since they cancel on taking the average. This implementation is particularly simple and the about-turn represents the best configuration since it enables the measurement defects of each gyro in the horizontal plane to be eliminated by averaging, and thus makes it possible to obtain a heading that is independent of the drift errors of the two horizontal gyros. This implementation with measurements in two orientations represent the best compromise between the duration of measurement operations and the performance obtained.

In a second implementation, the device has only one gyro, and the predetermined number of orientations is not less than two, and is preferably not less than three.

It is necessary to have two orientations in order to determine heading, and the additional orientation serves to identify drift. With two orientations, two measurements and two associated drift equations are available: it is then possible to calculate a heading by averaging the measurements, thereby also averaging drift error, and to reinject the calculated heading into one of the two equations. It is thus possible to obtain an approximate value for the drift error and to refine the calculated heading value. With three orientations, the operation is simpler, since three measurements and three associated equations are available for determining three unknowns: the heading, measuring rotation in the plane, and measuring gyro drift. With three orientations, the angle between the orientations is preferably 120°.

The method of the invention can thus be adapted to inertial devices that have only one gyro, and it enables good performance to be obtained.

According to a particular characteristic of the invention, the inertial device is moved between its orientations by means of a rotary platform enabling it to be turned through a pre-adjusted angle.

The inertial device is thus simpler, since it is no longer necessary to determine the angle between the two angular positions of the inertial device, said angle being pre-adjusted to a known value.

Advantageously, the inertial device used has at least one accelerometer in association with a gyro, or at least two accelerometers in association with at least two gyros, the accelerometer measurements being processed to determine a positioning error of the inertial device relative to the horizontal, and thus to determine any interfering rotation of the system.

The inertial device may thus be positioned relative to the horizontal plane in more accurate manner. This makes it easier to position the inertial device in the field. The accelerometers may enable the system to be positioned relative to the horizontal (gravity) and to measure any interfering rotation of the system.

Advantageously, the electric angle is selected so as to have an associated drift value that is as small as possible.

This enables the accuracy of the determination to be further improved.

Other characteristics and advantages of the invention appear on reading the following description of a particular, non-limiting implementation of the invention.

Figure 2:
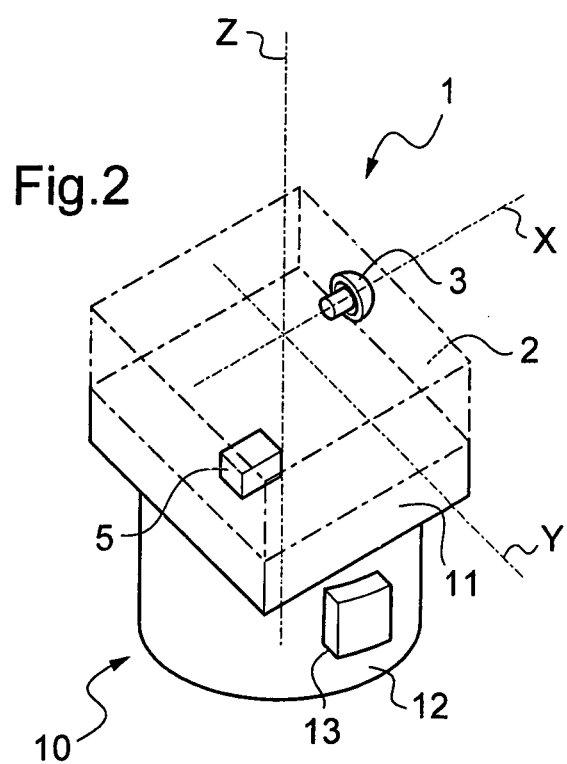

Reference is made to the accompanying drawing, in which:

FIG. 1 is a diagrammatic view of an inertial device for implementing the method of the invention, in a first implementation; and FIG. 2 is a view analogous to FIG. 1 of an inertial device adapted to a second implementation.

With reference to FIG. 1, the method is implemented by means of an inertial device given overall reference 1 and comprising a platform 2 (represented diagrammatically by chain-dotted lines) that is provided in known manner with three vibrating angle sensors or gyros given reference 3, and with three accelerometers given reference 4. The gyros 3 and the accelerometers 4 are arranged on three mutually orthogonal axes of a frame of reference. The gyros 3 and the accelerometers 4 are of structures that are themselves known. Only the structure of the gyros 3 is described herein in a little more detail in order to describe the method of the invention. Each gyro 3 comprises an axially symmetrical resonator made of a silica material fitted with electrodes that make it possible, in an excitation mode, to set the resonator into vibration in such a manner that its vibration is symmetrical relative to an axis perpendicular to a reference axis of the gyro 3 and of angular position about the reference axis that is adjustable by a control unit 5 via suitable electrical control of the electrodes, known as precession control. The angular position of the vibration is referred to as the electric angle. The electrodes are also used in a detection mode to determine the angular position of the vibration. In the measurement mode implemented in the method of the invention, the orientation of the vibration about the axis is left free, with the movement of the vibration relative to an initial position being usable to obtain information about angular movement of the sensor.

The gyros 3 and the accelerometers 4 are connected to the control unit 5 that is arranged to control the gyros 3, and to recover and process the signals coming from the gyros 3 and the accelerometers 4. Here the inertial device 1 is a conventional inertial unit for use in navigation.

The control unit 5 is arranged to execute a program for controlling the inertial device in a gyro compass mode. The program implements the method in accordance with the invention for determining a heading, in particular towards the north.

The method comprises the steps of:
placing the inertial device 1 successively in two angular orientations about a vertical axis Z;
for each orientation, adjusting the electric angles of the horizontal plane gyros 3 to predetermined values and taking respective measurements; and
determining the heading from the measurements and from an angle between the orientations.

The two orientations are offset from each other by 180°.

The predetermined value of the electric angle is the same for all angular positions of the inertial device. Here the value of the electric angle is advantageously selected so as to have drift with a value that is as small as possible.

For each orientation, the predetermined electric angle is controlled by the vibrating angle sensors 3 situated on the axes x and y of the horizontal plane. The electric angle is set to the same value for the measurements by acting on the precession command (during and/or after changing the orientation of the inertial device).

The signals coming from the angle sensors and the accelerometers are then measured in order to determine the heading, possibly with the help of knowledge concerning the latitude of the system. This calculation is performed in conventional manner, e.g. by means of regressions and trigonometric formulae, or else by integrating measurements in a navigation model and a Kalman filter.

After taking measurements in the first orientation, the inertial device is moved into the second orientation. The offset between the two orientations is measured using the gyros 3.

The electric angle is then adjusted to the same value as for the first measurement on both of the gyros 3 situated in the horizontal plane.

The signals coming from the sensors are detected and the heading is then determined as before.

The final value of the heading is then determined by calculating the average of the two headings, thus making it possible to average the errors associated with the measurements. Implementation using a navigation model, and for example a Kalman filter, performs this operation directly.

For two orientations that are offset by an angle other than 180°, the heading accuracy is also improved.

In a variant, as shown in FIG. 2, the method of the invention may be implemented by means of an inertial device 1 having a platform 2 provided with only one gyro 3 that is for positioning in the horizontal plane. The inertial device is mounted on a rotary device 10 having a turntable 11 supported on a pivot base 12 enabling the turntable 11 to be pivoted about an axis normal thereto. The pivot base 12 incorporates a system 13 for adjusting the angle of the turntable about the axis of rotation. This type of angle adjustment system is itself known and is to be found for example in indexing plates for machine tools. By way of example the angle adjustment system may comprise members for locking the turntable in predetermined positions (the locking members comprising, for example, a radial bolt secured to the turntable 11 and suitable for engaging in recesses formed at predetermined positions in a stationary housing for the pivot base 12 of the rotary device). The turntable 11 should be positioned horizontally, e.g. with the help of spirit levels secured to the rotary device 10. In a variant, if the inertial device 1 includes accelerometers, they may be used for determining the angle of inclination of the turntable of the rotary device and of the inertial device fastened to the turntable of the rotary device, and so as to enable said angle of inclination to be taken into account in known manner in order to determine a positioning error for the inertial device relative to the horizontal or in order to determine the heading.

The method includes the steps of causing the turntable to pivot so as to position the inertial device successively in three orientations. The three orientations are spaced apart from one another by 120°. In a variant, it is possible to use four orientations at 90°, or even more.

With the turntable held stationary in each orientation, the electric angle is re-set on a predetermined position and a measurement is taken.

The measurements are processed as described above.

Naturally, the invention is not limited to the particular implementations described, but also covers any variant coming within the ambit of the invention as defined by the claims.

In particular, the inertial device may have some other number of gyros or accelerometers, but the inertial device must nevertheless include at least one gyro.

The predetermined number of orientations may be greater than two in the first implementation and the differences may be arbitrary.

In the second implementation, the differences between the orientations may be arbitrary.

The implementation may be generalized to systems that do not have axes that are orthogonal.

The implementation may be generalized to vibratory gyros having two axes.

Implementation may be of the continuous type, in particular with a Kalman filter, or of the discontinuous type.

The invention claimed is:

1. A method of determining a heading by means of an inertial device (1) providing measurements by means of at least one vibratory gyro (3), the method comprising the steps of:
 positioning the inertial device in such a manner that the gyro extends close to a plane that is substantially horizontal;
 orienting the inertial device successively in a predetermined number of orientations about a vertical axis, the predetermined number being greater than one;
 for each orientation, adjusting the electric angle of the vibratory gyro to a predetermined value, the predetermined value of the electric angle being the same for all of the orientations of the inertial device, and taking a measurement; and
 determining the heading from the measurements and an angle between the orientations.

2. A method according to claim 1, the inertial device having a single gyro, wherein the predetermined number of orientations is not less than two and is preferably not less than three.

3. A method according to claim 2, wherein the angle between the orientations is 120°.

4. A method according to claim 1, wherein the device has at least two gyros positioned so that both gyros extend in the vicinity of the horizontal plane, and the predetermined number of orientations is not less than two.

5. A method according to claim 4, wherein the angle between the orientations is 180°.

6. A method according to claim 1, wherein the inertial device is moved between its orientations by means of a rotary platform (11) enabling it to be turned through a pre-adjusted angle.

7. A method according to claim 1, wherein the inertial device (1) used comprises at least one accelerometer in association with a gyro or at least two accelerometers in association with at least two gyros, the measurements from the accelerometer(s) being processed to determine a positioning error of the inertial device relative to the horizontal and also any interfering rotation of the system.

8. A method according to claim 1, wherein the electric angle is selected so as to have a drift value associated therewith that is as small as possible.

9. A method according to claim 1, wherein the heading is determined by calculating an average of the measurements.

10. A method according to claim 1, wherein the heading is determined by integrating the measurements in a navigation model and a Kalman filter.

* * * * *